Figure 1:
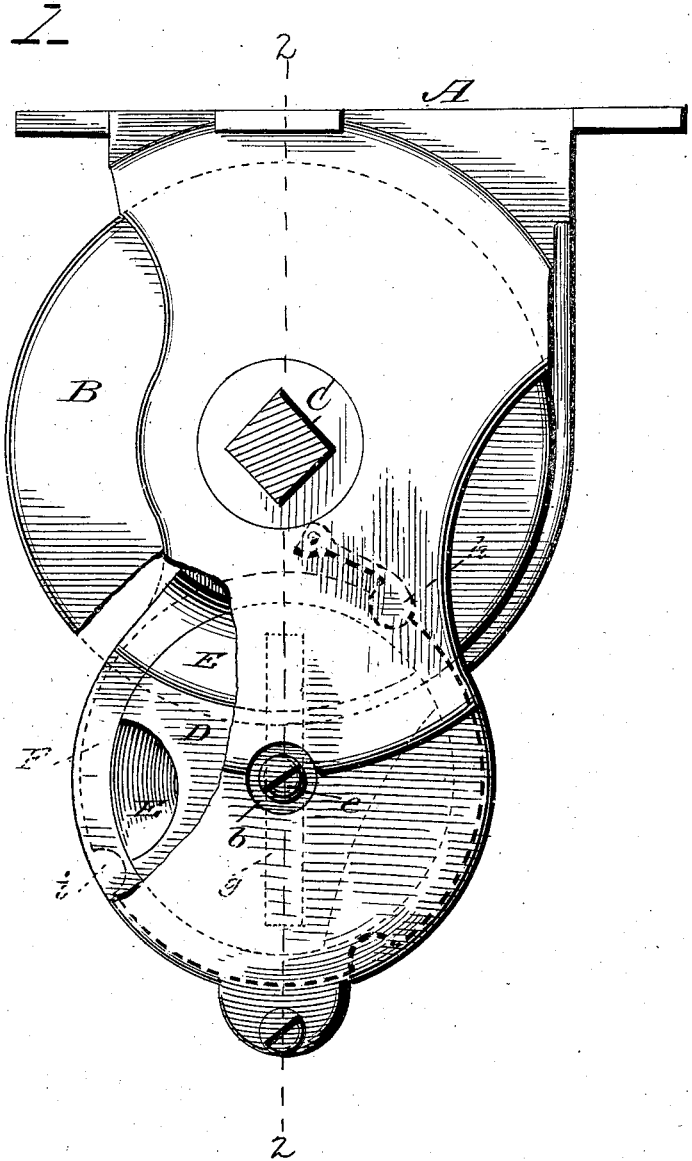

No. 844,322. PATENTED FEB. 19, 1907.
H. B. BOZARD.
GRAIN DISTRIBUTER.
APPLICATION FILED JAN. 7, 1907.

2 SHEETS—SHEET 1.

Inventor
Harrison B. Bozard

Witnesses

By Chas. N. Fowler
Attorney

No. 844,322. PATENTED FEB. 19, 1907.
H. B. BOZARD.
GRAIN DISTRIBUTER.
APPLICATION FILED JAN. 7, 1907.
2 SHEETS—SHEET 2.
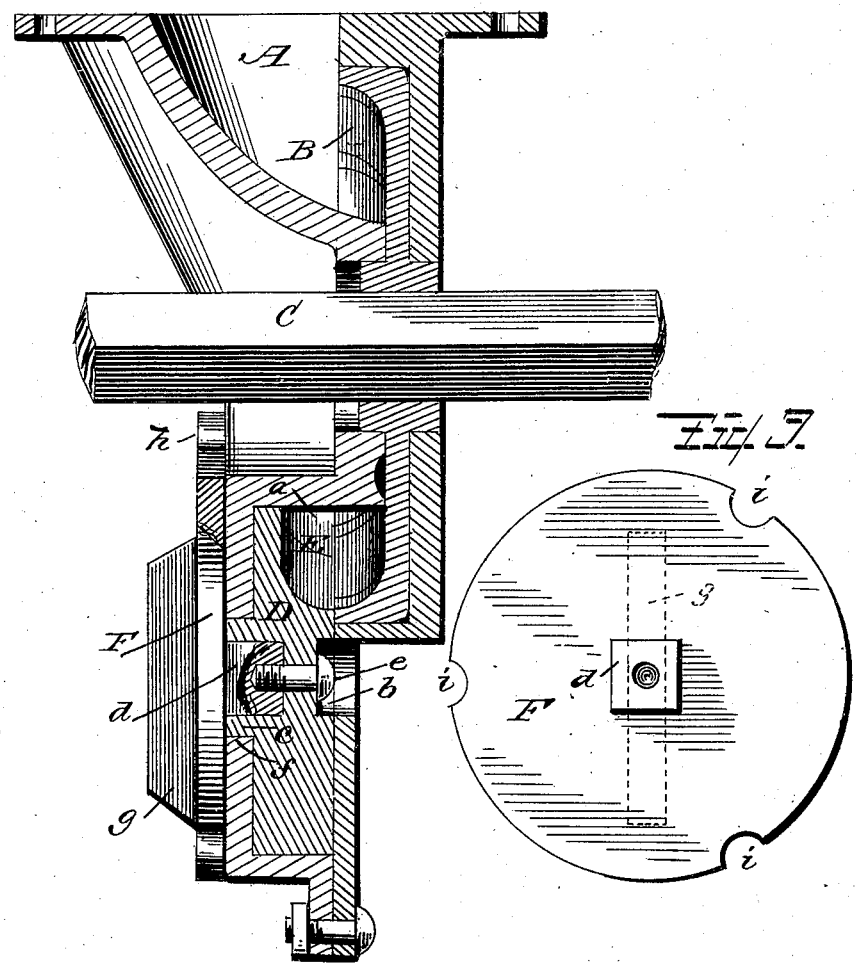
Witnesses
Inventor
Harrison B. Bozard.
By
Attorney

UNITED STATES PATENT OFFICE.

HARRISON B. BOZARD, OF ALLEGANY, NEW YORK, ASSIGNOR TO THE AMERICAN SEEDING MACHINE COMPANY, OF SPRINGFIELD, OHIO, A CORPORATION OF OHIO.

GRAIN-DISTRIBUTER.

No. 844,322.　　　Specification of Letters Patent.　　　Patented Feb. 19, 1907.

Application filed January 7, 1907. Serial No. 351,147.

*To all whom it may concern:*

Be it known that I, HARRISON B. BOZARD, a citizen of the United States, residing at Allegany, in the county of Cattaraugus and State of New York, have invented certain new and useful Improvements in Grain-Distributers; and do hereby declare that the following is a full, clear, and exact description of the same, reference being had to the annexed drawings, making a part of this specification, and to the letters and figures of reference marked thereon.

The present invention has relation to that class of force-feed seeding-machines or grain-distributers in which is employed a vertical feed-wheel adapted to rotate within a suitable seed cup or hopper or like receptacle for containing the seed, and means for taking the seed as it passes from the seed cup or hopper and distributing it in regulated quantities, and has special reference to my former patent of November 27, 1906, No. 836,664, in which an adjustable distributing disk or wheel is used having pockets or depressions of varying capacities to regulate the throat-orifice of the seed cup or hopper to discharge the grain in any regulated quantity.

In the patent above referred to the several distributing disks or wheels would be mounted upon one and the same shaft, which shaft would be of such length as to render the same liable to contortion, twisting, or otherwise become imperfectly straight throughout its length.

It is the purpose of the invention to remedy this defect, and in place of using the shaft employed in my former patent the several distributing disks or wheels will be supported independent of any shaft and capable of independent adjustment, thereby dispensing with the shaft, which has serious objections, in that its contortions would vary the disks or wheels and render them defective.

The invention consists in a distributing disk or wheel adjustably mounted substantially as shown in the drawings and hereinafter described and claimed.

Figure 1 of the drawings is a side elevation of a seed cup or hopper, partly broken away to show the distributing disk or wheel. Fig. 2 is a side elevation, partly in section, showing the seed cup or hopper, the feed-wheel located therein and mounted upon the usual shaft, the distributing disk or wheel, and the means employed for supporting the same, the section being taken on line 2 2 of Fig. 1; Fig. 3, an inner side plan view of the holding-plate.

In the accompanying drawings, A represents the usual seed cup or hopper, in which is located the feed-wheel B, mounted upon the shaft C. The construction of the seed cup or hopper, the feed-wheel and shaft upon which it is mounted is the same as in my former patent, but may be of any preferred form and construction.

The distributing disk or wheel D has a plurality of pockets E, so that any one of the number of pockets may be brought on line with the throat $a$ of the seed cup or hopper to form one of the walls thereof, thereby regulating the size of the throat-discharge opening and thereby determining the quantity of seed sown and the speed determining the quantity of seed per acre.

So far as I have described the distributing disk or wheel D it is the same as in my former patent, with the exception that it is not mounted upon a shaft, and therefore it is constructed especially to be connected without the aid of a shaft and capable of ready adjustment.

The disk or wheel D is formed on one side with a mortise $b$ and upon the opposite side with a flat-sided hub $c$—that is, the interior of said hub is flat-sided to receive a flat-sided short axle $d$, having a central screw-hole therein to receive the screw-threaded end of a screw $e$. The hub $c$ extends through an opening $f$ in the side of the seed cup or hopper which supports the disk or wheel D, the mortise $b$, which receives the head of the screw, enabling the disk or wheel to turn in its bearing when adjusted. The short flat-sided axle $d$ is integral with a holding-plate F, which is provided with a thumb-piece $g$ for turning it, or any suitable means may be provided for this purpose, and after the disk or wheel D has been adjusted by turning the plate it is held in its adjusted position by a suitable pivoted dog $h$ upon the outside of the seed cup or hopper which engages one of a plurality of notches $i$ on the periphery of the plate, or any other suitable and wellknown means may be employed for holding the disk or wheel stationary after being adjusted.

Having now fully described my invention, what I claim as new, and desire to secure by Letters Patent, is—

1. In a grain-distributer, an adjustable distributing disk or wheel supported wholly by the side or sides of the wall of the seed cup or hopper, and means for adjusting the disk or wheel and holding it in its adjusted position, substantially as and for the purpose set forth.

2. In a grain-distributer, an adjustable distributing disk or wheel having a hub with interior flat sides, a holding-plate having an axle with flat sides to engage the hub and means for securing it therein, said plate having means for turning it and means for holding the plate stationary after the disk or wheel has been adjusted.

In testimony whereof I affix my signature, in presence of two witnesses, this 21st day of December, 1906.

HARRISON B. BOZARD.

Witnesses:
 THAYER K. MORROW,
 CHAS. I. WELCH.